Figure 1:
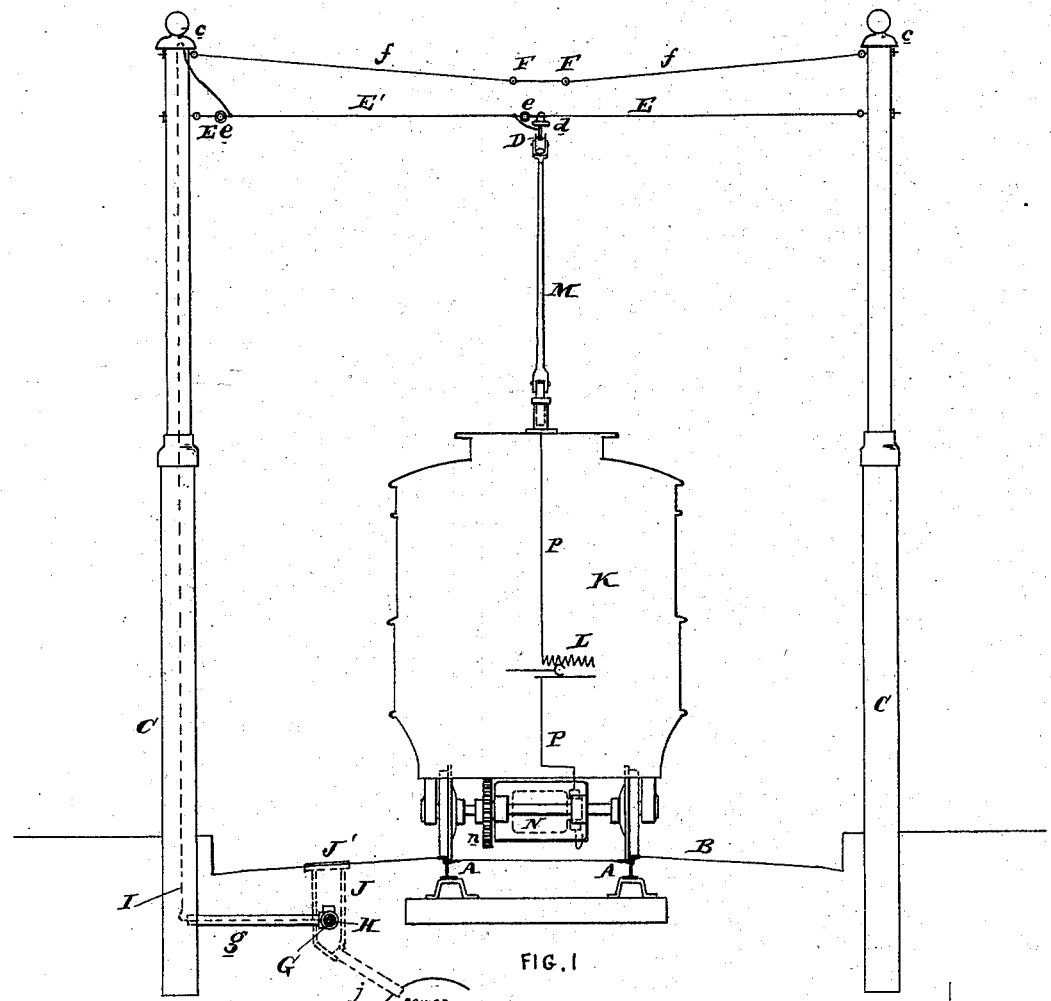

(No Model.)

R. M. HUNTER.
ELECTRIC RAILWAY.

No. 559,175. Patented Apr. 28, 1896.

Attest:

Inventor

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRIC RAILWAY.

SPECIFICATION forming part of Letters Patent No. 559,175, dated April 28, 1896.

Application filed July 8, 1893. Serial No. 479,869. (No model.)

*To all whom it may concern:*

Be it known that I, RUDOLPH M. HUNTER, of the city and county of Philadelphia and State of Pennsylvania, have invented an Improvement in Electric Railways, of which the following is a specification.

My invention has reference to electric railways; and it consists of certain improvements which are fully set forth in the following specification and shown in the accompanying drawings, which form a part thereof.

This application (Case No. 260) has particular reference to electric railways employing a suspended working conductor with which the trolley carried on the electrically-propelled vehicle makes contact. This application is more especially upon the details of construction of the general invention set out and claimed in my application, (Case No. 259,) Serial No. 479,868, filed July 8, 1893, and which is a division of my application, Serial No. 214,309, filed September 23, 1886.

In carrying out my invention I arrange along the roadway a railway-track, the rails of which are electrically connected to form a good return-circuit, and upon each side of said track I place metal poles, from which is hung the suspended trolley or working conductor. I furthermore place within a suitable conduit or case arranged parallel with the railway and located underground an insulated supply-conductor which connects at intervals with the suspended working conductor by insulated circuits leading to the poles through suitable conduits or cases and then supported by the poles and connected at the top with the suspended conductor. In cases where the poles are tubular the connecting-circuits extend up within the poles and are shielded thereby and guarded against injury or contact with persons leaning against the poles. The danger of short-circuiting the current is thus materially reduced.

The current delivered to the supply-conductor and rails is of constant potential, and the source of power is a constant-shunt or compound-wound generator or dynamo, provided, if desired, with a hand-regulator to vary its output to suit the occasional varying demand of current caused by the varying number of cars in operation.

The supply-conductor conduit or casing is provided at branching points with manholes leading to the surface of the street, and these may, if desired, have a drain-pipe leading to the sewer.

The car is provided with an electric motor carried upon and geared to the axles, and is also furnished with a trolley pivoted to the roof and making an underrunning contact with the suspended conductor—as set out, for example, in Letters Patent No. 398,402, granted to me on February 26, 1889. The current is delivered from the trolley to the motor by a motor-circuit on the car, which is provided with a regulator of any suitable construction—such, for instance, as set out in Patent No. 432,752, granted to me July 22, 1890, or in Patent No. 385,055, granted to me June 26, 1888.

My invention will be better understood by reference to the accompanying drawings, in which—

Figure 2:
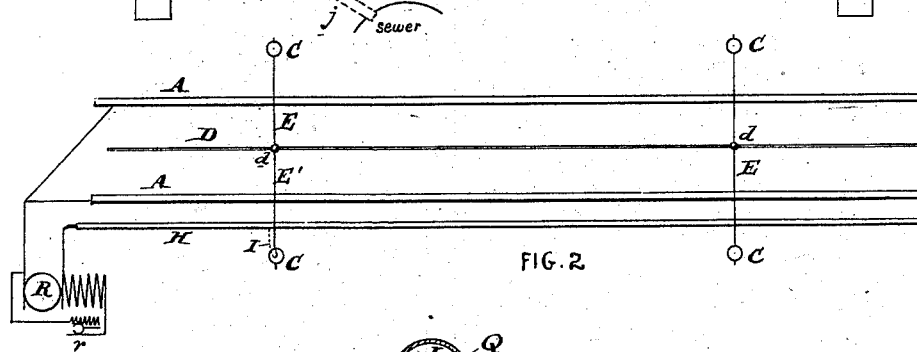
Figure 3:
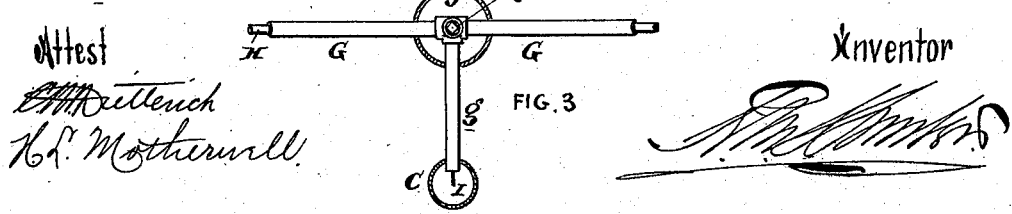

Figure 1 is a transverse sectional elevation of a railway as applied to the street of a city. Fig. 2 is a plan view illustrating the electric circuits of same, and Fig. 3 is a plan view showing the method of delivering current from the supply-conductor to the suspended conductor.

B is the roadway arranged between the pavements or sidewalks and is provided with the rails A A, supported in any suitable manner, so as to constitute a continuous firm foundation for the electrically-propelled vehicles, and also so as to constitute a return-conductor of low resistance.

C C are two tubular metallic posts arranged upon opposite sides of the street and support the suspended conductor D at a point above the car running upon the railway A. The suspended conductor is connected to cross-wires by suitable insulators *d*, the cross-wires E being attached to the upper parts of the poles C.

F F are two longitudinal guard-wires arranged above the suspended conductor or trolley-wire and are held in position by transverse suspension-wires *f*, also connected to the upper parts of the poles C C. The tops of the poles are provided with caps *c* to prevent rain passing down through the poles, and also to provide a suitable covering or shield for the branch conductor which supplies current to the trolley-wire D.

H is the supply-conductor suitably insulated and inclosed in a conduit G, of any suitable construction, which latter is embedded in the ground under the roadway and to one side of the track. At intervals the said conduit or tube G is provided with laterally-projecting portions $g$, which enter or approximately unite with the lower parts of the poles C below the ground, and a branch conductor I, leading from the supply-conductor H, is delivered through the branch conduit $g$ and carried upward through the tubular pole C, thence downward from the cap $c$, connecting by part E′ with the trolley-wire D. As shown, the part E′ of the branching conductor I is made to act as part of the suspension-wire for the trolley-wire. In this case small insulators $e$ are arranged in the suspension-wire so as to prevent any possibility of short-circuiting. The branch wires I are not connected with the trolley-wire at every pole C, but at such intervals as is necessary to deliver the proper current to the trolley-wire and so as to couple the suspended working conductor and supply-conductor in parallel, as is fully disclosed in Letters Patent No. 440,595, dated November 11, 1890.

In Fig. 2 the left-hand pole C is shown as containing the branch conductor I, whereas the right-hand pole supports the trolley-wire without connection with the supply-conductor. The poles C are arranged at intervals along the railway, and it will be understood that some of them are provided with branch conductors I, while others are not, as many branch conductors being employed as the railway may require to deliver the proper current to the cars operating in circuit. The branch conductors I are insulated so as to prevent any possibility of short-circuiting through contact with the metallic poles C. At the branch points of the conduit G $g$ a removable plug or cover Q may be employed for the purpose of exposing the connection between the conductors H and I for repairs and otherwise. These parts of the conduit and caps or covers Q are preferably inclosed in a chamber J opening to the street and provided with a water-tight cover J′. The lower part of the compartment J may be connected by a drain-pipe $j$ with the sewer to prevent any possibility of water collecting and submerging the joint of the conduit. The compartment J as well as the conduit may be formed of any suitable construction and may be of metal without the masonry.

K is the electrically-propelled car and is provided with an upwardly-extending pivoted trolley substantially of the character set out in Letters Patent No. 398,402, above referred to, and is provided with an underrunning contact-wheel, making an elastic pressure with the under side of the suspended conductor or trolley-wire D. The car is provided with one or more electric motors N in the usual manner, which motors are geared or otherwise connected at $n$ to rotate the axle. The motors are preferably carried on the axles independently of the car-body. A motor-circuit P connects the trolley with the wheels and axle of the car and includes the electric motor N.

A suitable regulator L, of any of the various constructions heretofore employed, may be used in the motor-circuit for controlling the motor. There are any number of electrically-propelled cars desired operating in parallel and receiving current from the suspended conductor and returning it by the rails.

R is a constant-potential electric generator of any well-known type, and has one of its terminals connected with the rails or return-conductor, while the other terminal is connected with the supply-conductor H. The electric generator is provided with a rheostat or regulator $r$ for varying the output of the machine to suit the requirements of the line.

I do not confine myself to the particular details of construction here shown, as it is quite evident that they may be modified without in the least departing from the principle of my invention.

What I claim as new, and desire to secure by Letters Patent, is—

1. In an electric railway, the combination of a railway-track arranged along the roadway, a series of poles located along each side of the roadway and arranged in pairs one or more series of which poles are made tubular, a suspended conductor or trolley-wire arranged at a suitable elevation above the railway-track and supported from the upper parts of the poles by transverse suspension-wires, a conduit arranged along the roadway and embedded therein and having branch openings at intervals communicating with the interior of the tubular poles, a supply-conductor arranged within the conduit and insulated therefrom, branching conductors connecting the supply-conductor at intervals with the suspended trolley-wire arranged within the branching portions of the conduit and shielded by the tubular posts, removable caps or covers for the branching points of the conduit, inclosed compartments opening to the street and provided with removable covers for access to said branch points of the conduit, and a source of electrical energy having its terminals respectively connected with the supply-conductor and rails.

2. In an electric railway, the combination of a railway-track arranged along the roadway, a series of poles located along each side of the roadway and arranged in pairs one or more series of which poles are made tubular, a suspended conductor or trolley-wire arranged at a suitable elevation above the railway-track and supported from the upper part of the poles by transverse suspension-wires, a conduit arranged along the roadway and embedded therein and having branch openings at intervals communicating with the interior of the tubular poles, a supply-conductor arranged within the conduit and insulated therefrom, branching conductors connecting the supply-conductor at intervals with the suspended trolley-wire arranged within the branching portions of the conduit and shielded by the tubular poles, removable caps or covers for the branching points of the conduits, inclosed compartments opening to the street and provided with removable covers for access to said branching points of the conduit, drainage connections from the said compartments to the sewer, and a source of electrical energy having its terminals respectively connected with the supply-conductor and rails.

In testimony of which invention I have hereunto set my hand.

R. M. HUNTER.

Witnesses:
ERNEST HOWARD HUNTER,
C. M. DIETTERICH.